United States Patent [19]

Woodworth et al.

[11] Patent Number: 4,620,647
[45] Date of Patent: Nov. 4, 1986

[54] LUBRICATING LIQUID DISPENSER

[75] Inventors: John L. Woodworth, Hopkinton; John M. Lynch, Paxton, both of Mass.

[73] Assignee: Kidde, Inc., Saddle Brook, N.J.

[21] Appl. No.: 769,497

[22] Filed: Aug. 26, 1985

[51] Int. Cl.⁴ .............................. B65D 37/00
[52] U.S. Cl. ................... 222/215; 222/566; 285/239; 285/915; 403/377; 29/157 R; 29/525; 29/DIG. 1
[58] Field of Search ............... 222/215, 460, 462, 206, 222/573, 566; 220/66, 67, 359; 285/239, 238, 915; 403/377, 203, 202; 29/157 R, 525, DIG. 1; 53/452

[56] References Cited

U.S. PATENT DOCUMENTS

| | | |
|---|---|---|
| 2,500,639 | 3/1950 | Lermer .................................. 222/215 |
| 2,673,661 | 3/1954 | Barton ............................. 222/215 X |
| 3,245,701 | 4/1966 | Leopold, Jr. et al. .......... 285/239 X |
| 3,807,776 | 3/1974 | Bingham ........................ 285/238 X |

FOREIGN PATENT DOCUMENTS

| | | |
|---|---|---|
| 66704 | 12/1982 | European Pat. Off. ............ 285/239 |
| 719104 | 2/1932 | France ................................. 222/215 |
| 2064043 | 6/1981 | United Kingdom ................ 285/238 |

Primary Examiner—Joseph J. Rolla
Assistant Examiner—Edward S. Ammeen
Attorney, Agent, or Firm—John E. Toupal; Harold G. Jarcho

[57] ABSTRACT

A liquid dispenser including a hollow plastic adapter defining a cavity extending between axially aligned open ends thereof, the cavity having a uniform cylindrical portion terminating at one of the open ends and a tapered portion joined to the cylindrical portion and tapering inwardly toward and terminating at the other open end; and a hollow metal hub defining a passage extending between axially aligned open ends thereof, the hub having a first cylindrical outer surface portion with a given diameter slightly greater than the uniform cylindrical portion and press fit therein, a second cylindrical outer surface portion with a predetermined diameter less than the given diameter and projecting out of the other open end of the adapter, and a tapered outer surface portion joining the first and second cylindrical surface portions and engaging the tapered portion of the adapter. Also included in the dispenser are an elongated metal tubular spout projecting from one end of the hub and defining a liquid discharge path communicating with the passage and a plastic container bonded to the one end of the adapter and defining a liquid filled volume communicating with the passage.

14 Claims, 4 Drawing Figures

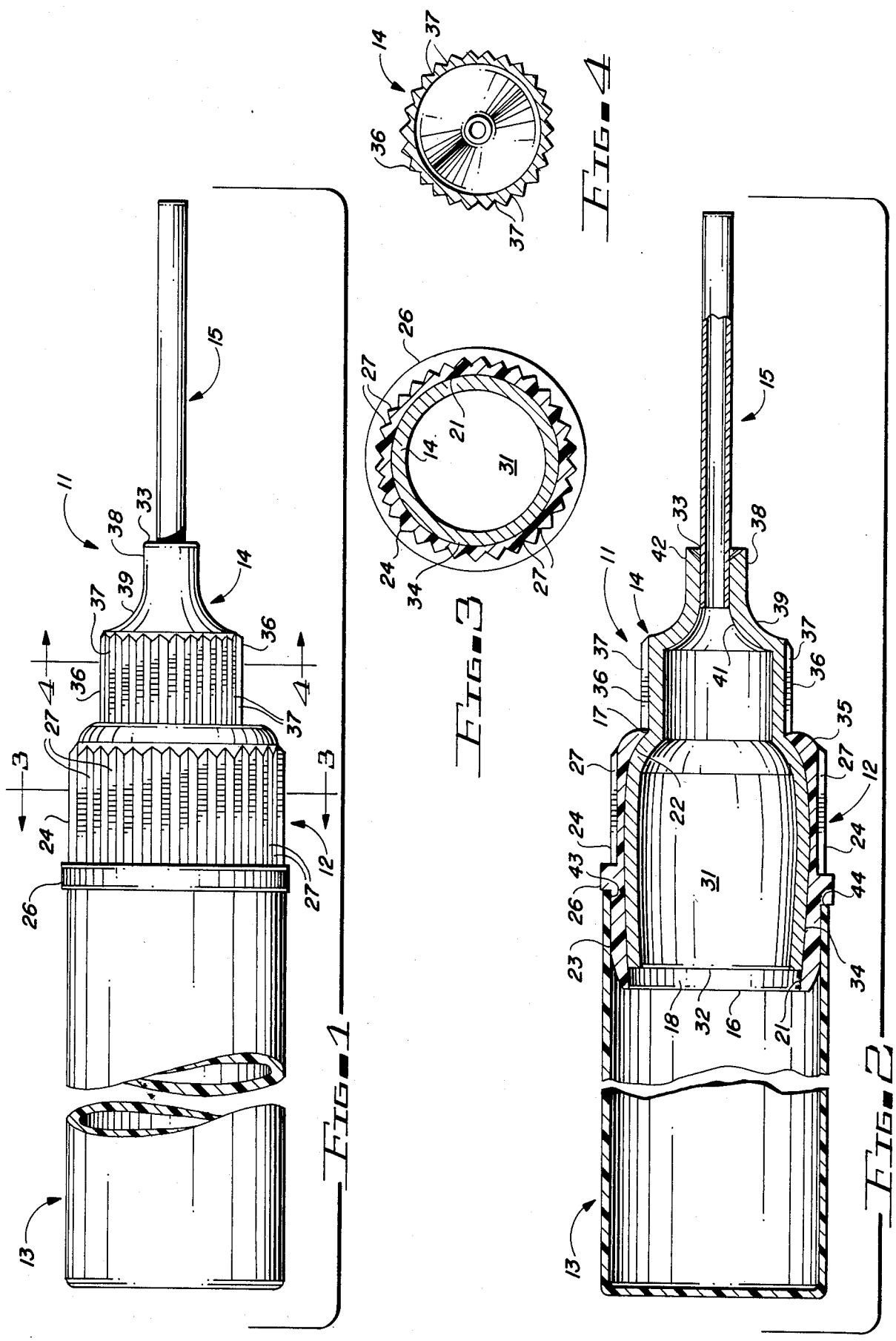

LUBRICATING LIQUID DISPENSER

BACKGROUND OF THE INVENTION

This invention relates generally to a liquid dispenser and, more particularly, to a dispenser specifically suited for use in the selective lubrication of mechanical devices.

Containers for dispensing lubricating liquids are used in a variety of applications in which lubrication is required on particular surfaces of machinery. Typically, lubrication dispensers consist of a container filled with a lubricating liquid and a discharge spout through which the liquid is discharged. Although available in a variety of configurations, existing lubrication dispensers are not satisfactory for all applications. For example, some known dispensers are not suitable for applying lubricating liquids to partially obstructed surfaces of machinery or to those operating at elevated temperature. Other dispensers are costly to either fabricate or assemble and fill with a liquid lubricant.

The object of this invention, therefore, is to provide an improved, relatively inexpensive lubricant dispenser that can be used in a wide variety of applications.

SUMMARY OF THE INVENTION

The invention is a liquid dispenser including a hollow plastic adapter defining a cavity extending between axially aligned open ends thereof, the cavity having a uniform cylindrical portion terminating at one of the open ends and a tapered portion joined to the cylindrical portion and tapering inwardly toward and terminating at the other open end; and a hollow metal hub defining a passage extending between axially aligned open ends thereof, the hub having a first cylindrical outer surface portion with a given diameter slightly greater than the uniform cylindrical portion and press fit therein, a second cylindrical outer surface portion with a predetermined diameter less than the given diameter and projecting out of the other open end of the adapter, and a tapered outer surface portion joining the first and second cylindrical surface portions and engaging the tapered portion of the adapter. Also included in the dispenser are an elongated metal tubular spout projecting from one end of the hub and defining a liquid discharge path communicating with the passage and a plastic container bonded to the one end of the adapter and defining a liquid filled volume communicating with the passage. The adapter is structurally compatible with the hub and materially compatible with the container and thereby facilitates the creation of liquid tight seals therebetween, the plastic container reduces cost, and the metal hub and spout render the dispenser useful for dispensing lubricants directly onto high temperature surfaces.

According to another feature of the invention, the hub further comprises a third cylindrical outer portion with a diameter less than the predetermined diameter and joined to the second cylindrical portion, the third cylindrical portion defining a reduced diameter portion of the passage that receives an end of the tubular spout and being crimped thereto. This arrangement simplifies the creation of a seal between the spout and hub.

According to another feature of the invention, the plastic container is fused to the plastic adapter with a solvent. The use of compatible materials for the container and the adapter facilitates this efficient sealing technique.

According to still other features of the invention, the adapter comprises a cylindrical outer surface longitudinally divided into first and second adapter surfaces by a circumferential rib with the first adapter surface terminating at the one open end and second adapter surface terminating at the other open end and the container is a hollow cylinder having an open end received by the adapter and abutting the circumferential rib and with an inner surface portion of the container engaging the first adapter surface. The rib functions to accurately position the container on the adapter.

According to yet another feature of the invention the third cylindrical portion of the hub and the second adapter surface each defines a plurality of longitudinally oriented, circumferentially spaced apart grooves. The grooves facilitate handling of both the parts during assembly and the assembled dispenser during use.

DESCRIPTION OF THE DRAWINGS

These and other objects and features of the invention will become more apparent upon a perusal of the following description taken in conjunction with the accompanying drawings wherein:

FIG. 1 is a schematic side view of a dispenser according to the invention;

FIG. 2 is a schematic longitudinal cross sectional view of the dispenser shown in FIG. 1;

FIG. 3 is a schematic cross sectional view taken along lines 3—3 of FIG. 1; and

FIG 4 is a schematic cross sectional view taken long lines 4—4 of FIG. 1.

DESCRIPTION OF THE PREFERRED EMBODIMENT

A dispenser 11 specifically suited for dispensing lubricating liquids is illustrated in FIGS. 1-4. The dispenser 11 includes an adapter 12 that functions as a coupling between a container 13 and a hub 14. Retained by the hub 14 is an elongated tubular spout 15 for precisely directing lubricating fluid discharged from the container 13. Preferably the adapter 12 and the container 13 are made of a suitable plastic such as butyrate while the hub 14 and the tubular spout 15 are made of metal.

The adapter 12 is a hollow cylinder having open opposite ends 16, 17 that extend between a central cavity 18. Defining the central cavity 18 are a uniform cylindrical surface portion 21 that terminates at the open end 16 and an adjoining surface portion 22 that tapers inwardly to terminate at the open end 17. The outer surface of the adapter 12 includes a first cylindrical adapter surface 23 terminating at the open end 16 and a second cylindrical adapter surface 24 terminating at the other open end 17. Separating the first and second adapter surfaces 23, 24 is a circumferential rib 26. A plurality of circumferentially spaced apart, longitudinally oriented grooves 27 are formed in the second adapter surface 24.

The hollow metal hub 14 defines a passage 31 that extends between axially aligned open ends 32, 33. A first cylindrical outer surface portion 34 of the hub 14 terminates at the open end 32 and is joined by a tapered outer surface portion 35 to a second cylindrical outer surface portion 36 with a predetermined diameter less than the given diameter of the first surface portion 34. Formed in the second outer surface portion 37 are a plurality of circumferentially spaced apart, longitudinally oriented grooves 37. A third cylindrical outer surface portion 38 of the hub 14 terminates at the open end 33 and is joined to the second outer surface portion 36 by a concavely tapered intermediate outer surface portion 39. The third outer surface portion 38 has a diameter smaller than the predetermined diameter of the second outer surface portion 36. Coextensive with the third outer surface portion 38 of the hub 14 is a reduced diameter portion 41 of the passage 31 that accommodates an inner end 42 of the tubular spout 15.

During assembly of the dispenser 11, the inner end 42 of the tubular spout 15 is first positioned in the reduced diameter portion 41 of the passage 31. A crimping force is then applied around the third outer surface portion 38 to create a seal between the inner end 42 of the tubular spout 15 and the reduced diameter portion 41. Next, the assembled hub 14 and spout 15 are inserted through the open end 16 of the adapter 12. Because the diameter of the first outer surface portion 34 of the hub 14 is slightly greater than that of the cylindrical portion 21 of the cavity 18, the surface 34 must be press fitted into the cavity 18 until the tapered outer surface portion 35 of the hub 14 engages the inwardly tapered surface portion 22 of the adapter 12. With the adapter 12 and the hub 14 in those relative positions, the second outer surface portion 36, the third outer surface portion 38 and the tubular spout 15 project out of the open end 17 of the adapter 12 as shown in FIGS. 1 and 2. The press fit between the cylindrical surface portion 34 of the hub 14 and the inner surface portion 21 of the adapter 12 creates a liquid-tight seal therebetween.

After the container 13 has been filled with a suitable lubricating liquid, the container 13 is attached to the preassembled adapter 12, hub 14 and tubular spout 15. During the attachment operation the first outer adapter surface 23 is inserted into an open end 43 of the filled tube 13 until and outer edge 44 thereof abuts against the circumferential rib 26. A bond is created between the outer adapter surface portion 23 and an engaged inner surface of the container 13. Preferably, the bond is created by the application to the outer adapter surface 23 of a solvent that attacks the compatible plastic surfaces of the adapter 12 and the container 13 to cause fusion thereof.

Obviously, many modifications and variations of the present invention are possible in light of the above teachings. It is to be understood, therefore, that the invention can be practiced otherwise than as specifically described.

What is claimed is:

1. A liquid dispenser comprising:
   a hollow plastic adapter defining a cavity extending between axially aligned open ends thereof; said cavity having a uniform cylindrical portion terminating at one of said open ends and an adjoining portion joined to said cylindrical portion and projecting radially inwardly toward and terminating at said other open end;
   a hollow metal hub defining a passage extending between axially aligned open ends thereof; said hub having a first cylindrical outer surface portion with a given diameter slightly greater than said uniform cylindrical portion and press fit therein, a second cylindrical outer surface portion with a predetermined diameter less than said given diameter and projecting out of said other open end of said adapter, and a connecting outer surface portion joining said first and second cylindrical surface portions and engaging said adjoining portion of said adapter;
   an elongated metal tubular spout projecting from one end of said hub and defining a liquid discharge path communicating with said passage; and
   a plastic container bonded to said one end of said adapter and defining a liquid filled volume communicating with said passage.

2. A dispenser according to claim 1 wherein said hub further comprises a third cylinder outer portion with a diameter less than said predetermined diameter and joined to said second cylindrical portion, said third cylindrical portion defining a reduced diameter portion of said passage that receives an end of said tubular spout.

3. A dispenser according to claim 2 wherein said third cylindrical portion of said hub is crimped to said end of said tubular spout.

4. A dispenser according to claim 3 wherein said plastic container is fused to said plastic adapter.

5. A dispenser according to claim 4 wherein said plastic container is fused to said plastic adapter with a solvent.

6. A dispenser according to claim 5 wherein said second cylindrical portion of said hub defines a plurality of longitudinally oriented, circumferentially spaced apart grooves.

7. A dispenser according to claim 1 wherein said adapter comprises a cylindrical outer surface longitudinally divided into first and second adapter surfaces by a circumferential rib with said first adapter surface terminating at said one open end and second adapter surface terminating at said other open end.

8. A dispenser according to claim 7 wherein said container is a hollow cylinder having a container open end received by said adapter and abutting said circumferential rib with an inner surface portion of said container engaging said first adapter surface.

9. A dispenser according to claim 8 wherein said hub further comprises a third cylindrical outer portion with a diameter less than said predetermined diameter and joined to said second cylindrical portion, said third cylindrical portion defining a reduced diameter portion of said passage that receives an end of said tubular spout.

10. A dispenser according to claim 9 wherein said third cylindrical portion of said hub is crimped to said end of said tubular spout.

11. A dispenser according to claim 10 wherein said plastic container is fused to said plastic adapter.

12. A dispenser according to claim 11 wherein said plastic container is fused to said plastic adapter with a solvent.

13. A dispenser according to claim 12 wherein each of said second cylindrical portion of said hub and said second adapter surface defines a plurality of longitudinally oriented, circumferentially spaced apart grooves.

14. A dispenser according to claim 13 wherein said adjoining portion of said adapter and said connecting outer surface portion of said hub are mated tapered surfaces.

* * * * *